United States Patent Office 3,458,389
Patented July 29, 1969

3,458,389
METHOD AND MEANS FOR PRODUCING A LAMI-
NATED INSULATION FROM TAPE-SUPPORTED
INORGANIC PARTICLE LAYERS IMPREGNATED
WITH THERMOSETTING EPOXIDE-HARDENER
MIXTURES
Willi Mertens, Berlin, Germany, assignor to Siemens
Aktiengesellschaft, Erlangen, Germany, a corporation
of Germany
Continuation of application Ser. No. 381,176, July 8,
1964. This application Aug. 22, 1968, Ser. No. 764,003
Claims priority, application Germany, July 11, 1963,
S 86,125
Int. Cl. B32b 5/16
U.S. Cl. 161—170          13 Claims

ABSTRACT OF THE DISCLOSURE

Described is an insulating tape for producing a tape-wound insulating jacket to be impregnated with a thermosetting mixture of epoxide and hardener components. The tape comprises a pliable web, a layer of inorganic broad-area particles of high dielectric strength, and an adhesive substance bonding said particles to one another and to said web. The adhesive substance is bondable into said thermosetting mixture through groups selected from carboxyl, hydroxyl and sulfhydryl and reactive with at least one of said components. The tape also contains an accelerator additive for the hardening reaction of the impregnating mixture. Also described is the method of producing said tape.

---

Figure 1:
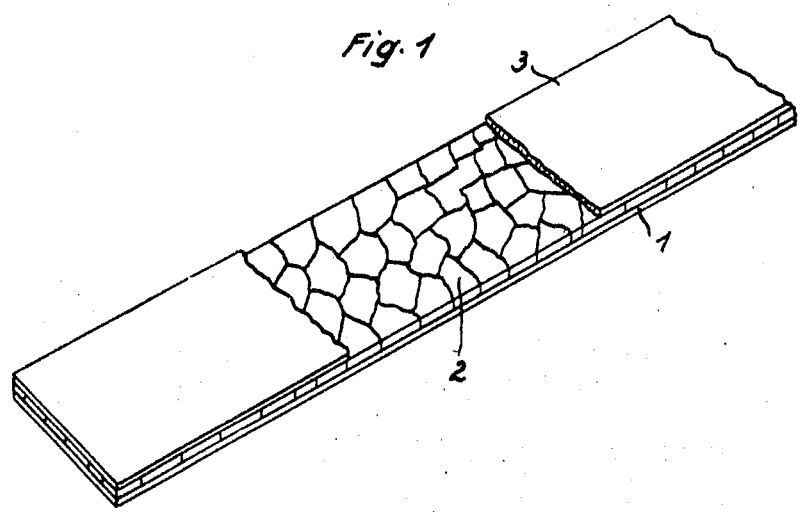

This application is a continuation of my application Ser. No. 381,176, filed July 8, 1964, now abandoned and relates to a laminated insulation for electric conductors consisting of tape-supported inorganic particle layers impregnated with thermosetting epoxide-hardener mixtures.

It is known to produce electrical insulation, such as the insulating enclosure on electrical conductor rods or the windings of electrical machines, from flexible tapes coated with mica scales, which are bonded to one another and to the web material of the tape, or additionally to a pliable cover material, by a liquid adhesive which can be hardened but is not self-hardening. The term "liquid" as herein understood refers to adhesives having a viscosity in the range of 25 to 10,000 poise at 25° C. The composite insulating tape may be relatively narrow, for example 2 to 3 cm. wide, or it may be used in sheets of greater width. After wrapping the tape about the conductor to be insulated, the conductor with the tape-wound insulation thereupon, is subjected to vacuum and impregnated with a thinly liquid impregnating resin. The resin and the adhesive are so chosen relative to each other that the adhesive, together with the hardeners and polymerization accelerators contained in the impregnating resin, completely combines chemically with the impregnating resin, so that the hardened synthetic resin constitutes a chemically uniform body in the finished insulating jacket.

Instead of using tapes exclusively containing mica in form of the above-mentioned scales, it is also known to employ tapes composed of mica paper placed upon pliable web material. "Mica paper" is a mica material produced from mica pulp by methods corresponding to those of paper manufacture. It is further known to compose insulating tapes for the above-mentioned purposes conjointly from mica scales and mica paper. Glass flakes may be added to such an insulating tape, or the tape may be composed exclusively of glass flakes on a pliable supporting web. In all of these cases it is only essential that the insulating tape, for producing the winding insulation of electrical machines, provide a pliable supporting web with a layer of broad-area particles consisting of an inorganic material having a high dielectric strength to resist voltage breakdown.

According to known methods of making insulating tapes of this type, unsaturated polyesters are used as impregnating resin, these esters being obtained, for example, by reacting $\alpha,\beta$-unsaturated dicarboxylic acids with glycols. Reactive monomers, such as styrene or triallylcyanurate for example, are then added to these unsaturated polyesters, and unsaturated polyesters without the addition of reactive monomers are employed as the adhesive for binding the constituents of the composite mica tape together. Since the adhesive, when wrapping the tape about the conductor, is soft and not yet hardened, the very pliable mica tape can be tightly wrapped around sharp edges.

It is essential, particularly for insulating sleeves that are to be resistant to high voltage; that during the impregnating step the impregnating resin have a viscosity not appreciably above 30 cp. so that the insulating enclosure is completely penetrated by the impregnating resin. Such a low viscosity can be secured with the polyester resins heretofore used by diluting them with styrene or another reactive monomer. These polyester impregnating resin mixtures, with a proper dosage of decelerators and accelerators, secure a prolonged shelf life without increase in viscosity. Therefore, after impregnating the wrapped conductors, the excessive amount of polyester impregnating resin mixture can be pumped back into a storage container and is thereafter available for further impregnations. Since at normal room temperature the viscosity of the polyester impregnating resin does not increase, the pumping and storing can be repeated very often so that the impregnating mixture can be employed for a large number of impregnation cycles.

However, the large proportion of the low-molecular reactive substances in the polyester resin impregnation mixture has the disadvantage of relative severe shrinking. This requires particular expedients to compensate for shrinking during the hardening process. The danger of such shrinking can be decreased considerably by resorting to impregnating resin systems with lower shrinkage characteristics, such as constituted, for example, by thermosetting epoxide resin mixtures on the basis of bi- or higher-functional glycidyl ethers or epoxide compounds and acid anhydrides. These thermal hardening epoxide resin mixtures, however, have the disadvantage that their viscosity continuously increases during storage. Since furthermore their initial viscosity is higher than that of the diluted polyester impregnating resin mixtures, the epoxide-resin mixtures require higher impregnating temperatures in order to have a viscosity below 30 cp. during the impregnating process. Due to the higher temperature, the addition polymerization reaction of the epoxide-resin mixtures, which is the cause of the rapid viscosity increase during storage, is accelerated to a still greater extent. Although the choice of suitable epoxide-resin mixtures affords keeping the spontaneous reaction within bearable limits so that the resin mixtures remain applicable for more than 100 hours even at an impregnating temperature of 60° to 70° C., these resin mixtures require an unbearably long time for complete hardening.

According to my copending application Ser. No. 204,445, filed June 22, 1962 (assigned to the assignee of the present invention), the above-mentioned difficulties encountered with the use of epoxide resins for insulating electric conductors by inorganic-layer tapes, can be greatly minimized by employing an adhesive hardener-free epoxide compound and simultaneously adding to the tape an accelerator which excites the poly-addition reaction of the thermosetting epoxide mixture used for impregnation but which does not substantially stimulate the ionic polymerization of epoxide compounds. Such insulating tapes can be stored several months without increase in viscosity of the epoxide compounds employed as adhesive, so that such tapes are applicable virtually without limitation within the periods of time usually involved in the production of the slot-winding conductors for large electrical machines. However, since the accelerator contained in the tape has the property of promoting the poly-addition reaction of the epoxide-resin mixtures subsequently employed as impregnating resin, the impregnation can be effected with epoxide-hardener mixtures of a very low rate of reaction. Hence, these mixtures can be employed for a large number of impregnating cycles without appreciable increase in viscosity of the impregnating bath.

The present invention is related to the just-described method disclosed in my application Ser. No. 204,445 and has for its object to further improve the tape insulation and its manufacture by doing away with the limiting requirement that the added accelerator must not affect the ionic polymerization of epoxide compounds.

According to the present invention, I employ as adhesive substance for binding the inorganic particles to one another and to the supporting web material, a compound which is capable of being chemically built into the thermosetting epoxide-hardener mixture to be used as impregnation and which contains radicals reactive with the epoxide resin and/or with the hardener container in the mixture; and I simultaneously add to the insulating tape an accelerator which stimulates the hardening reaction of the impregnating epoxide-resin mixture. The radicals through which the adhesive agent is chemically built into the thermosetting epoxide-hardener mixture of the impregnation preferably are constituted by carboxyl groups, hydroxyl groups or sulfhydryl (also called mercapto) groups.

Insulating tapes according to the invention have an unlimited shelf life because the system contained in the tape and formed of binding agent and accelerator although hardenable is not self-hardening. The accelerator need not be chosen from the viewpoint of avoiding ionic polymerization of epoxides. Since the adhesive substance employed for binding the constituents of the insulating tape together, does not contain any epoxide groups, it is immaterial whether the added accelerator also stimulates the ionic polymerization of epoxide compounds. Consequently, it is essential to the hardener-free adhesive substance used for the purpose of the invention, that this substances does not contain any epoxide groups but nevertheless is fully combinable chemically with the epoxide-hardener mixture subsequently employed for impregnating the insulating sleeve or jacket to be wound from the tape.

When an insulating jacket is made of tape according to the invention and is being impregnated, the accelerator contained in the tape stimulates the hardening reaction of the impregnating epoxide-resin mixture, so that the impregnating material may consist of thermosetting mixtures of epoxide resin and hardeners having a very low rate of reaction. Thus a complete penetration of all layers in the tape-wound insulation is secured by virtue of a low viscosity, preferably less than 30 cp. Due to the slight reaction speed of the impregnating mixture, it can be employed for a large number of impregnating cycles without appreciable increase in viscosity.

The proportion of the adhesive substance in the finished insulating jacket may be about 15 to 30%, for example. For that reason, compounds which can be built into the epoxide-resin hardener system through primary or secondary amine groups are not advantageous because the adducts of primary or secondary amines in epoxide groups result in relatively slightly thermal aging. In this respect, however, a detrimental effect of tertiary amines has not been observed. It is advisable, therefore, to select from this viewpoint not only the compounds employed as an adhesive in the insulating tape, but also the accelerators added to the tape. For that reason, I prefer using as accelerators in tapes according to the invention di- or polytertiary aliphatic-aromatic amines such as 4,4'-dimethylaminodiphenylmethane, 4,4' - dimenthylaminotriphenylmethane, 4,4'-4''-dimethylaminotriphenylcarbinol or 4,4'-dimethylaminobenzophenone for example. Also applicable as accelerators to be added to the insulating tape according to the invention are tertiary amines, for example benzyldimethylamine, triethanolamine, n-methylmorpholine or N-$\beta$-oxyethylmorpholine.

For obtaining a better thermal-aging stability, it is advisable to avoid amine epoxy adducts in the finished insulating jacket, also by employing a correspondingly selected thermosetting mixture of epoxide resin. Generally, therefore, it is preferable to employ as impregnating resin for tapes according to the invention a thermosetting mixture of epoxide resin and acid anhydride.

When during impregnation the epoxide-resin mixture penetrates into the insulating jacket tape-wound according to the invention, there is some danger that the compounds used as adhesive substance and the accelerator contained in the tape are washed away by the entering impregnating mixture. This danger can be obviated by adapting the adhesive substance, accelerator and impregnating resin to one another so that the resorption time of the compound used as adhesive substance and/or of the accelerator with respect to the epoxide impregnation is long in comparison with the impregnating period, but is short in comparison with the hardening time required for the resinous mixture penetrated into the insulating jacket. For this purpose, it is preferable to employ a compound as the adhesive substance, which is not readily soluble in the impregnating resin, and to mix this compound with the accelerator. In some cases, it is also suitable to select as the accelerator, a compound having low solubility in the entering impregnating resin. That is, the dissolution of these compounds in the entering epoxide-resin mixture should require a much longer period of time than the penetration of the mixture into the insulating jacket. However, the dissolving period must be considerably shorter than the desired gelling or hardening period of the penetrated impregnating resin. Applicable accelerators and adhesives have been mentioned above, and further examples are described hereinafter.

The quantity of accelerator added to the insulating tape is preferably so chosen that the proportion of the accelerator is about 0.2 to 2% by weight relative to the impregnating mixture of epoxide resin and hardener ultimately contained in the tape-wound insulating jacket. Consequently, the quantity of accelerator to be added to the insulating tape during its manufacture depends upon how much inorganic material, for example mica, per unit area of the supporting web material is contained in the tape, and also depends upon the proportion of the adhesive substance employed in the tape. Generally, it is preferable to keep the amount of adhesive substance during manufacture of the tape not higher than necessary, so that the subsequently employed impregnating resin can readily penetrate into the hollow spaces remaining within the tape. As a rule, therefore, the proportion of the compounds used as an adhesive in the insulating tape is kept between 3 to 7% relative to the total weight of the insulating tape. With such a proportion of the adhesive substance, it is advisable to keep the quantity of accelerator approximately in the order of 0.1 to 0.5% relative to the total weight of the insulating tape.

Described in the following are examples of compounds applicable as adhesive substances in insulating tapes according to the invention.

Suitable compounds capable of being fully built chemically through carboxyl groups into the epoxide-resin system employed as impregnating resin, are adducts produced by addition of 1.5 to 2 moles of a dicarboxylic acid, for example adipic acid, to a bisepoxide compound having an epoxy equivalent of 175 to 200.

Compounds which are suitable as adhesive substances in tapes according to the invention and can be built chemically through hydroxyl groups into the system of epoxide resin and hardener used as impregnation, are compounds produced by addition of 2 moles of a monovalent phenol, for example xylene to a bisepoxide having an epoxy equivalent of 175 to 200. Other examples of this type are compounds producible by addition of 1.3 to 2 moles of a monocarboxylic acid, such as capronic acid, to a bisepoxide compound having an epoxide equivalent of 175 to 200.

Also applicable as adhesive substances in tapes according to the invention are compounds that become built into the system of epoxide resin and hardener through sulfhydryl groups. Examples of this type are adducts producible by addition of hydrogen sulfide to bisepoxide compounds through barium sulfhydrate.

Figure 2:
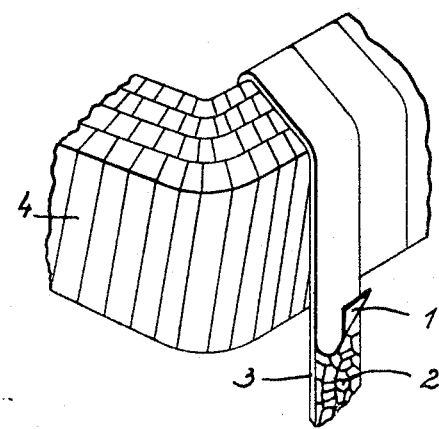

The invention will be further described with reference to the accompanying drawings in which:

FIG. 1 is a schematic and perspective view of a mica tape according to the invention on enlarged scale, and FIG. 2 is a perspective and fragmentary view of an electric-machine winding being wrapped with mica tape according to FIG. 1.

The insulating tape comprises a pliable base of sheet material. Used for this purpose, for example, is rice paper or other cellulosic tissue having a thickness of a few microns. Also applicable as the base layer is a web of other material such as asbestos, nylon film or other synthetic foil. Placed upon the base layer 1 is a layer 2 of mica flakes. Applicable instead of mica flakes or scales is mica paper or glass flock material. The inorganic particle layers covered by another layer 3 consisting preferably of the same material as the base layer 1. If desired, however, the base layer 1 and the cover layer 3 may consist of different pliable materials.

The mica particles in layer 2 are bonded together and to the base and cover layers by means of an adhesive substance consisting of an adduct of 1.5 moles capronic acid to a bisepoxide compound having an epoxide equivalent of 175 to 200. The proportion of this adhesive substance is approximately 3 to 7% relative to the weight of the tape. Added to the just-mentioned adhesive substance, to serve as an accelerator, is 4,4'-dimethylaminotriphenylmethane in a quantity of 5% relative to the total weight of the tape. Since the compound employed for bonding the tape components together, does not contain any hardener, the tape has an unlimited shelf life.

For producing the insulating sleeve or jacket of the winding rod for an electrical machine, the insulating tape shown in FIG. 1 and composed in the above-described manner, is wound about the winding or conductor rod as illustrated in FIG. 2. After the rod 4 is wrapped with the insulating tape, and after being dried, preferably in vacuum, it is impregnated with a thermosetting epoxide-resin mixture consisting of bi- or higher functional glycidyl ethers or epoxide compounds and acid anhydrides. The impregnating temperature is approximately 60 to 70° C., to make certain that the epoxide impregnating mixture, during impregnation, has a viscosity of less than 30 cp. and hence will fully impregnate the tape-wound insulation on the conductor. Thereafter, the access of impregnating mixture is pumped back to a storage vessel for repeated use, since its useful lifetime is a great multiple of the time required for an impregnating cycle.

I claim:

1. Insulating tape for producing a tape-wound insulating jacket to be impregnated with a thermosetting mixture of epoxide and hardener components, comprising a pliable web, a layer of inorganic broad-area particles of high dielectric strength, adhesive substance bonding said particles to one another and to said web, said adhesive substance being hardener-free and bondable into said thermosetting mixture through groups selected from carboxyl, hydroxyl and sulfhydryl and reactive with at least one of said components, and being about 3 to 7% of the weight of the tape and said tape containing an accelerator additive for the hardening reaction of the impregnating mixture of about 0.1 to 5% of the weight of the tape.

2. Insulating tape according to claim 1, wherein said hardener-free adhesive substance of about 3 to 7% of the weight of the tape is chemically combinable through carboxyl groups into said thermosetting mixture of epoxide resin and hardener.

3. Insulating tape according to claim 1, wherein said hardener-free adhesive substance of about 3 to 7% of the weight of the tape has hydroxyl groups through which it is chemically bondable into said thermosetting mixture of epoxide resin and hardener.

4. Insulating tape according to claim 1, wherein said hardener-free adhesive substance of about 3 to 7% of the weight of the tape has sulfhydryl groups through which it is chemically bondable into said thermosetting mixture of epoxide resin and hardener.

5. In an insulating tape according to claim 1, said hardener-free adhesive substance of about 3 to 7% of the weight of the tape being an adduct from 1.5 to 2 mole of dicarboxylic acid to bisepoxide compound having an epoxide equivalent of 175 to 200.

6. In an insulating tape according to claim 1, said hardener-free adhesive substance of about 3 to 7% of the weight of the tape being an adduct from 1.5 to 2 mole of adipic acid to bisepoxide compound having an epoxide equivalent of 175 to 200.

7. In an insulating tape according to claim 1, said hardener-free adhesive substance of about 3 to 7% of the weight of the tape being an adduct from 2 mole of monovalent phenol to bisepoxide compound having an epoxide equivalent of 175 to 200.

8. In an insulating tape according to claim 1, said hardener-free adhesive substance of about 3 to 7% of the weight of the tape being an adduct from 2 mole of xylenol to bisepoxide compound having an epoxide equivalent of 175 to 200.

9. In an insulating tape according to claim 1, said hardener-free adhesive substance of about 3 to 7% of the weight of the tape being an adduct from 1.3 to 2 mole of monocarboxylic acid to bisepoxide compound having an epoxide equivalent of 175 to 200.

10. In an insulating tape according to claim 1, said hardener-free adhesive substance of about 3 to 7% of the weight of the tape being an adduct from 1.3 to 2 mole of capronic acid to bisepoxide compound having an epoxide equivalent of 175 to 200.

11. In an insulating tape according to claim 1, said accelerator additive being 0.1 to 5% of the weight of the tape of 4,4'-dimethylaminotriphenylmethane.

12. Insulating tape for producing a tape-wound insulating jacket to be impregnated with a thermosetting mixture of epoxide resin and acid anhydride, comprising a pliable web, a layer of inorganic broad-area particles of high dielectric strength, hardener-free adhesive substance bonding said particles to one another and to said web, said adhesive substance being bondable into said thermosetting mixture through groups reactive with at least one of said epoxide resin and said acid anhydride components and said groups being selected from those consisting of carboxyl, hydroxyl and sulfhydryl groups, said adhesive substance being about 3 to about 7% of the weight of the tape, and said tape containing an accelerator additive for the hardening reaction of the impregnating mixture in an amount of about 0.1 to about 5% of the weight of the tape.

13. The method of producing pliable tape for insulating electrical conductors, which comprises placing a layer of broad-area inorganic particles of high dielectric strength upon a sheet of pliable web material, applying 3 to 7% of the weight of the tape of a liquid hardener-free adhesive medium to the tape to bind said particles together and to said web material, said adhesive medium consisting of a substance completely bondable chemically into a thermosetting mixture of epoxide resin and hardener with which the tape is to be impregnated after being wound upon a conductor and having atom groups reactive with said mixture and selected from those consisting of carboxyl, hydroxyl and sulfhydryl groups, and also adding to said tape 0.1 to 5% of the weight of the tape of an accelerator for stimulating the hardening reaction with the impregnating mixture.

References Cited

UNITED STATES PATENTS

| | | | |
|---|---|---|---|
| 2,815,043 | 12/1957 | Kleiner et al. | 138—144 |
| 3,404,102 | 10/1968 | Starcher et al. | 161—184 X |
| 3,409,497 | 11/1968 | Roseland | 161—170 X |

HAROLD ANSHER, Primary Examiner

U.S. Cl. X.R.

156—330; 161—171, 185, 188